(12) United States Patent
Metzler et al.

(10) Patent No.: US 6,767,468 B1
(45) Date of Patent: Jul. 27, 2004

(54) METHOD TO REMOVE URANIUM/ VANADIUM CONTAMINATION FROM GROUNDWATER

(75) Inventors: Donald R. Metzler, DeBeque, CO (US); Stanley Morrison, Grand Junction, CO (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 10/207,895

(22) Filed: Jul. 31, 2002

Related U.S. Application Data

(60) Provisional application No. 60/310,207, filed on Aug. 3, 2001.

(51) Int. Cl.[7] .................................................. C02F 9/00
(52) U.S. Cl. ........................ 210/662; 210/667; 210/668; 210/669; 210/682; 210/747; 210/757
(58) Field of Search ................................ 210/662, 663, 210/667, 668, 669, 682, 724, 747, 757, 170

(56) References Cited

U.S. PATENT DOCUMENTS

| 5,362,394 | A | * | 11/1994 | Blowes et al. ............... 210/617 |
| 5,679,256 | A | * | 10/1997 | Rose .......................... 210/662 |
| 6,254,785 | B1 | * | 7/2001 | Phifer et al. ................. 210/747 |
| 6,254,786 | B1 | * | 7/2001 | Carpenter et al. .......... 210/747 |

OTHER PUBLICATIONS

"New Approach to In–Situ Treatment of Contaminated Groundwaters?", *Environmental Progress*, vols. 4, p. 168–170, McMurtry et al., Aug. 1985.

* cited by examiner

*Primary Examiner*—Ivars C. Cintins
(74) *Attorney, Agent, or Firm*—Mark F. LaMarre; Thomas G. Anderson; Paul A. Gottlieb

(57) ABSTRACT

A process for removing uranium/vanadium-based contaminants from groundwater using a primary in-ground treatment media and a pretreatment media that chemically adjusts the groundwater contaminant to provide for optimum treatment by the primary treatment media.

5 Claims, 3 Drawing Sheets

METHOD TO REMOVE URANIUM/VANADIUM CONTAMINATION FROM GROUNDWATER

PRIORITY

This application claims priority from Provisional Application No. 60/310,207 filed on Aug. 3, 2001. This application was filed during the term of the before-mentioned Provisional Application

STATEMENT AS TO RIGHTS TO INVENTIONS MADE UNDER FEDERALLY SPONSORED RESEARCH AND DEVELOPMENT

The Government has rights in this invention under contract through an employee-employer relationship.

BACKGROUND OF THE INVENTION

1. Field of the Invention

This invention relates to the removal of uranium-based contaminants from groundwater.

2. Description of Related Art

Groundwater in many localities has become contaminated by both natural and manmade impurities. Due to the considerable reliance on groundwater as a primary source of potable water, treatment of polluted groundwater to remove such contaminants has gained significant interest within the last decade. Many treatment systems for the removal of groundwater contaminants have been proposed, including pump-and-treat systems, well injection of treatment agents, and in-situ treatment. Due to the significant cost savings, in-situ treatment of groundwater has drawn considerable interest in recent years. In-situ treatment of groundwater is discussed in *NEW APPROACH TO IN-SITU TREATMENT OF CONTAMINATED GROUNDWATER*: McMurty et at., *Environmental Progress* 1985.

McMurty discusses the use of permeable barrier walls placed in trenches excavated into native aquifers to treat contaminated groundwater. The permeable barrier contains appropriate treatment media, such that the quality of the contaminated groundwater flowing through the media is significantly improved. McMurtry states that most in-situ groundwater treatments will be in isothermal, anaerobic, reducing environments. Many in-situ groundwater treatment systems take advantage of the naturally occurring condition, in conjunction with the selected treatment material to remove or transform the chemical contaminants in the groundwater into nonhazardous material. Typically treatment materials are limestone, activated carbon, active metals, or biological agents. Alternatively, a modified in-situ treatment system maybe used, wherein tanks or chambers, which are filled with a treatment media, are buried or partially buried in the ground. Groundwater is directed to the tank by piping. The modified in-situ system maybe preferred when the natural groundwater flow is complex and multi-demensional. The modified in-situ provides ease of installation in these situations. Also, ex-situ or above ground treatment systems may be used in order to reduce installation costs.

These groundwater treatment systems rely on certain process condition,to achieve the removal or adsorption of the desired contaminant. For example, the removal efficiency of the treatment material may rely on the assumption that certain constituents are present in the groundwater for treatment system to work. Alternatively, the treatment media may work more efficiently in an acidic or basic environment. Therefore, it may be necessary to pretreat or precondition the groundwater to optimize the removal or neutralization capability of the treatment media.

BRIEF SUMMARY OF THE INVENTION

An object of this invention is to provide a method to optimize the treatment efficiency of the media in an ex-situ groundwater treatment system.

This and other objectives of the invention, which will become apparent from the following description, have been achieved by a novel improvement to the in-situ groundwater treatment process for removing uranium-based contaminants from contaminated groundwater comprising: Ascertain the direction, volume, rate, and chemical composition of a zone of contaminants dissolved in the groundwater flowing through an aquifer. Then select an appropriate primary treatment media that will render the contaminated material inactive within the groundwater. Next, determine the preferred chemical composition of the groundwater for treatment by the primary treatment media. A pretreatment media is provided, such that the pretreatment media adjusts the chemical composition of the contaminated groundwater to the preferred chemical composition. A first repository is provided, and the pretreatment media is placed therein. The first repository is placed such that the flow of contaminated groundwater through the first repository enters the repository through the upstream side thereof. Further the placement is such that the flow of the contaminated groundwater in the aquifer is directed to pass through the pretreatment media and exit from the downstream side thereof. The permeability of the pretreatment media being such that the resistance to the passage of groundwater through the first repository is no greater that the resistance of the native aquifer to the passage of groundwater through the aquifer. The primary treatment media is provided and placed in a second repository. The second repository is such that the flow of contaminated groundwater from the first repository enters the second repository through the upstream side thereof. Further, the placement being such that the flow of the contaminated groundwater in the aquifer is directed to pass through the pretreatment media, and exit from the downstream side thereof. The permeability of the primary media being such that the resistance to the passage of groundwater through the first repository is no greater that the resistance of the native aquifer to the passage of groundwater through the aquifer. In order to provide improved treatment of the contaminated groundwater the groundwater exiting the first repository enters a settling pond where insoluble material is permitted to settle out of the groundwater in a settling pond or the like prior to the contaminated groundwater entering the secondary repository.

For treatment of uranium-based contaminants the primary treatment elemental iron. When the uranium-based contaminated groundwater is acidic, it is preferable to increase the pH of the groundwater with an alkaline material such as limestone. Preferably the limestone contains at least 90 weight percent calcium carbonate. The groundwater maybe maintained in its native anaerobic condition or allowed to react with oxygen in the air as required.

BRIEF DESCRIPTION OF THE SEVERAL VIEWS OF DRAWINGS

With this description of the invention, a detailed description follows with reference being made to the accompanying figures of drawings which form part of the specification, in which like parts are designated by the same reference numbers, and of which:

The invention is not limited in its application to the details and construction and arrangement of parts illustrated in the accompanying drawings since the invention is capable of other embodiments that are being practiced or carried out in various ways. Also, the phraseology and terminology employed herein are for the purpose of description and not of limitation.

DETAILED DESCRIPTION OF THE INVENTION

Description of the Preferred Embodiment(s)

Figure 1:
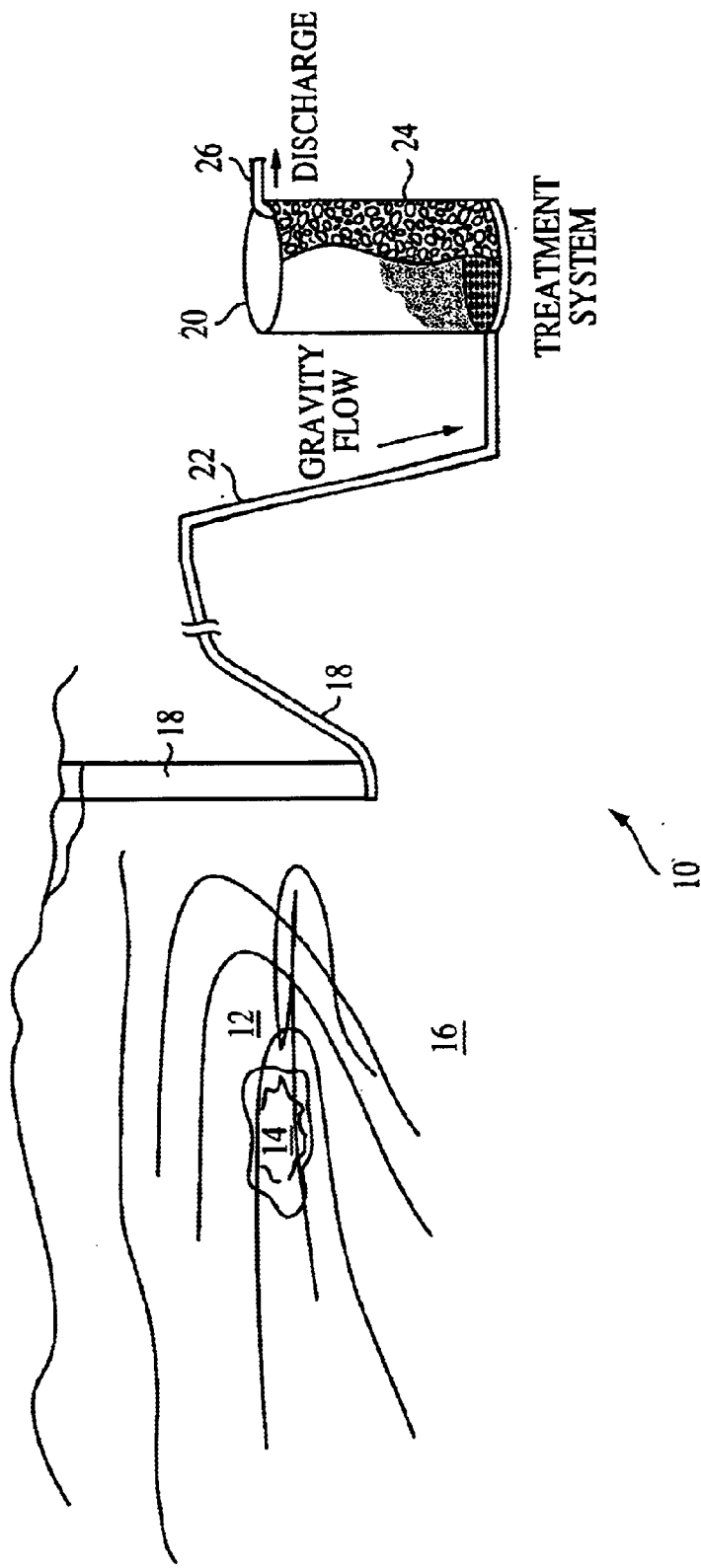
FIG. 1 is a diagrammatic view illustrating the treatment system of this invention.

Referring to FIG. 1 a typical groundwater treatment system as shown generally at 10. Groundwater 12 with contaminant 14 flows through an aquifer 16, to collection system 18 and into the first repository 20, via conduit 22. The contaminated groundwater passes through the treatment media 24 and is discharged via exit conduit 26. The treatment media 24 such as activated carbon may absorb the contaminant, or in the elemental metal may provide a suitable chemical environment for the conversion of the contaminant to an environmental safe specie. Often the contaminated groundwater, due to naturally occurring chemical compounds or through the addition of other contaminants, will not react with the treatment media in the preferred manner.

Figure 2:
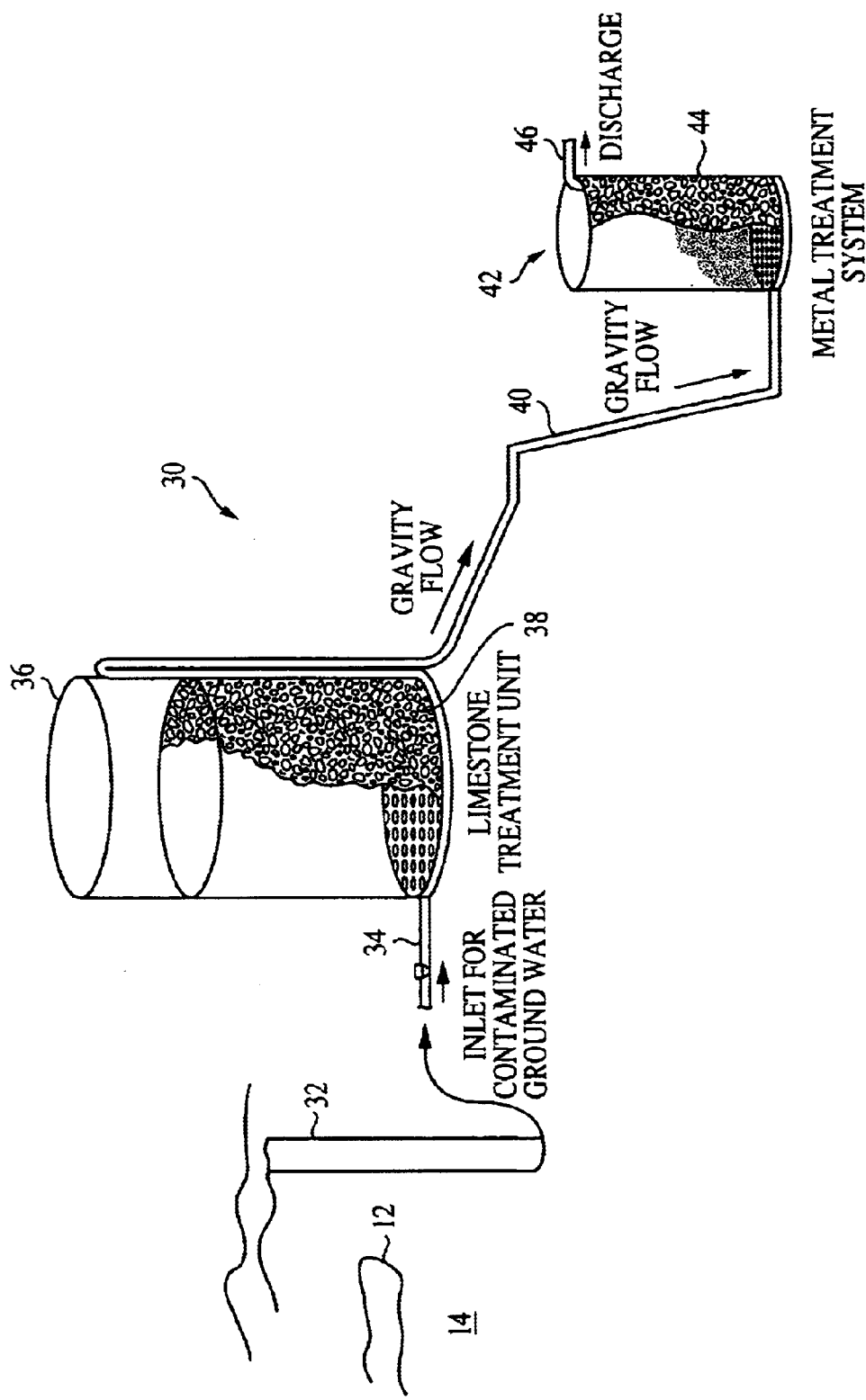
FIG. 2 is diagrammatic view illustrating an alternative treatment system of this invention and FIG. 3 is diagrammatic view illustrating a second alternative treatment system of this invention.

The improvement of this invention is shown in FIG. 2 generally at 30. Under normal condition, as noted hereinabove, groundwater 12 with the contaminant 14 flows though an aquifer 16. Under certain conditions the groundwater 12 or the contaminant may be modified, for example, having a low pH such that it will not react with the treatment media. In the case of groundwater contaminated with uranium-based impurities a neutral pH in the range of 6 is preferred when reacting groundwater with a reducing metal such as iron or copper. In the improvement as shown in FIG. 2 groundwater 12 with contaminant 14 flows into a second collection system 32, and passes though conduit 34 and into pretreatment tank 36. A pretreatment media 38 adjusts the conditions of the groundwater 12 to the desired condition. In the case of acidic or low pH groundwater, limestone can be used to raise the pH to the appropriate level. Preferably, high-calcium limestone that contains from 90 to 95 weight percent $CaCO_3$ should be used. The pH adjusted groundwater exits the pretreatment tank 38 via exit pipe 40 and flows due to gravity or by pumping (not shown) to the primary treatment tank 42. Here the primary treatment media 44 reacts with the contaminant material 14 in the groundwater 12 to be rendered inactive. Rendering the contaminant inactive may involve absorbing the contaminant into the media, making the contaminant insoluble in the groundwater, or converting it into an inert compound that is not harmful to the environment. The treated groundwater exits the system through outlet 46 and is treated by standard water pollution treatment systems before being returned to the environment. The treatment system shown herein is typically an aboveground system designed to treat groundwater that is passing through an aquifer on a contoured or sloping terrain.

Figure 3:
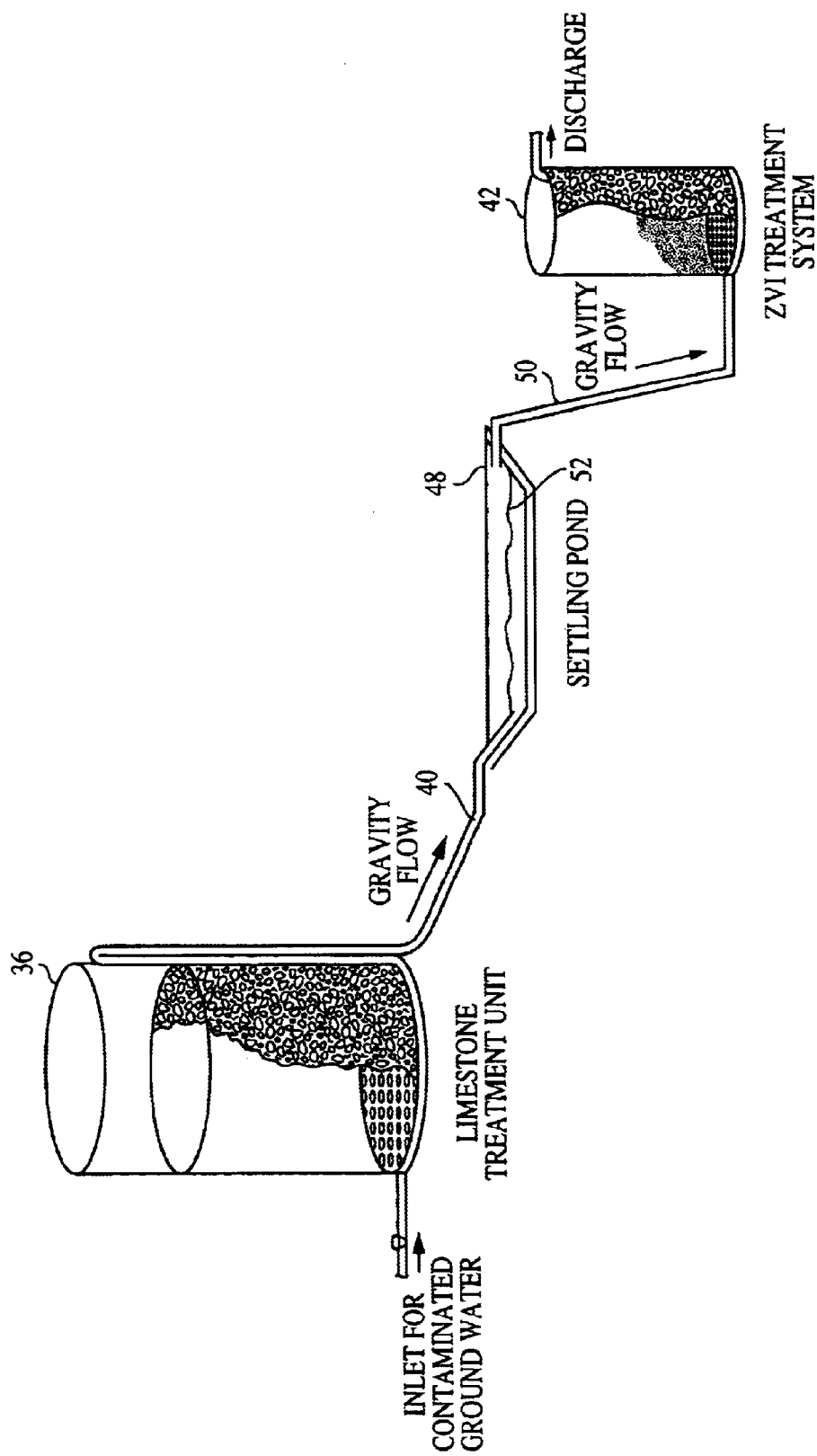

An additional modification to this invention is shown in FIG. 3, wherein a settling pond is interposed between the pretreatment tank 36 and the primary treatment tank 42. Herein the exit pipe 40 from the pretreatment tank 36 enters setting pond 48 where insoluble material is permitted to separate from the water. The water exits the settling pond 48 through exhaust pipe 50 and enters the primary treatment tank 42 wherein the contaminated water is treated as discussed hereinabove. The sediment 52 may be removed periodically for disposal or storage at an appropriate location. The sediment may be further treated to recover usable metals or compound prior to final disposal.

Although the invention as discussed herein discusses the adjustment of the pH of the groundwater to be pretreatment other pretreatment can be used. For example, it may be preferable to increase the concentration of certain minerals or metals within the groundwater to improve or optimize the reaction of the contaminant with the primary treatment media.

Thus, in accordance with the invention, there has been provided a method to optimize the treatment efficiency of the media in an ex-situ groundwater treatment system.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

We claim:

1. A process for removing uranium-based contaminants from contaminated groundwater comprising;

ascertaining the direction, volume, velocity, and chemical composition of a zone of contaminated material dissolved within groundwater flowing through an aquifer;

select a primary treatment media that will render the contaminated material inactive within the groundwater;

determining the preferred chemical composition of the groundwater for treatment by the primary treatment media, providing a pretreatment media, wherein the pretreatment media adjusts the chemical composition of the contaminated groundwater to the preferred chemical composition;

providing a first repository, and placing the pretreatment media therein;

placing the first repository such that the flow of contaminated groundwater through the first repository enters the repository through the upstream side thereof, the placement being such that the flow of the contaminated groundwater in the aquifer is directed to pass through the pretreatment media, and exit from the downstream side thereof;

the permeability of the pretreatment media being such that the resistance to the passage of groundwater through the first repository is substantially no greater that the resistance of the native aquifer to the passage of groundwater through the aquifer;

providing a primary treatment media, wherein the primary treatment media causes the contaminated material to be rendered inactive within the groundwater and wherein the primary treatment media contains elemental iron;

providing a second repository, and placing the primary treatment media therein;

placing the second repository such that the flow of contaminated groundwater from the first repository enters the second repository through the upstream side thereof, the placement being such that the flaw of the contaminated groundwater in the aquifer is directed to pass through the pretreatment media, and exit from the downstream side thereof; and the permeability of the primary treatment media being such that the resistance to the passage of groundwater through the first repository is substantially no greater that the resistance of the native aquifer to the passage of groundwater through the aquifer.

2. The process of claim 1 wherein the groundwater exiting the first repository enters a settling pond wherein insoluble material is permitted to settle out of the groundwater prior to the contaminated groundwater entering the secondary repository.

3. The process of claim 1 wherein the groundwater entering the first repository is anaerobic.

4. The process of claim 1 wherein the pretreatment media is limestone.

5. The process of claim 4 wherein the limestone contains at least 90 weight percent calcium oxide.

* * * * *